United States Patent [19]
Fell

[11] Patent Number: 5,339,660
[45] Date of Patent: Aug. 23, 1994

[54] QUICK RELEASE HUB

[76] Inventor: Holger Fell, Klarastr. 18, D-7800 Freiburg, Fed. Rep. of Germany

[21] Appl. No.: 974,577
[22] PCT Filed: May 11, 1992
[86] PCT No.: PCT/DE92/00399
 § 371 Date: Jan. 28, 1993
 § 102(e) Date: Jan. 28, 1993
[87] PCT Pub. No.: WO92/21551
 PCT Pub. Date: Dec. 10, 1992

[30] Foreign Application Priority Data

May 28, 1991 [DE] Fed. Rep. of Germany ....... 9106549
Dec. 21, 1991 [DE] Fed. Rep. of Germany ....... 4142507

[51] Int. Cl.$^5$ .............................................. E05B 71/00
[52] U.S. Cl. ......................................... 70/233; 70/225; 301/124.2
[58] Field of Search ............... 70/225, 233, 261, 232, 70/DIG. 57; 301/124.2, 111, 114

[56] References Cited

U.S. PATENT DOCUMENTS

| 4,033,627 | 7/1977 | Morroni | 301/124.2 |
| 4,114,409 | 9/1978 | Scire | 70/225 |
| 4,315,420 | 2/1982 | Oliver | 70/379 R |
| 4,567,741 | 2/1986 | Trempala | 70/DIG. 57 X |
| 4,574,602 | 3/1986 | Furuse | 70/232 |
| 4,724,692 | 2/1988 | Turin et al. | 70/225 |
| 4,770,011 | 9/1988 | Constant | 70/233 X |
| 4,944,168 | 7/1990 | Kortenbrede | 70/49 |
| 4,964,287 | 10/1990 | Gaul | 70/233 |
| 4,971,397 | 11/1990 | Nichols et al. | 301/111 X |
| 5,022,672 | 6/1991 | Kawai | 280/281.1 |

OTHER PUBLICATIONS

WO86/06695 of Nov. 20, 1986; Quick Release Assembly with Integral Lock.

Primary Examiner—Lloyd A. Gall
Attorney, Agent, or Firm—Robert W. Becker & Associates

[57] ABSTRACT

A quick release hub for bicycles has a fastener which is protected against theft. In the quick release hub a clamping element is axially displaceable by a pivotable eccentric bolt. The actuation of the eccentric bolt takes place with an insertable lever. A security device against theft is provided such that a lock locks or releases as desired the opening of the eccentric bolt for insertion of the lever.

9 Claims, 3 Drawing Sheets

QUICK RELEASE HUB

BACKGROUND OF THE INVENTION

The invention relates to a quick release hub for bicycles with a fastener secured against theft in which a clamping element is axially slidable by an eccentric bolt which is pivotable by inserting a lever into an opening thereof.

Quick release hubs for bicycles are known. They have the purpose, for example, with racing bikes or mountain bikes, to provide for a fast removal or replacement of wheels.

For the known quick release hubs a special lock is provided. This is comprised of a rod which axially penetrates the hub body and is axially slidable therein. On one end thereof a fixedly connected head is provided onto which a bolt-like clamping element is positioned and in which an eccentric bolt, pivotable by a lever, is pivotably supported. The pivoting of the eccentric bolt axially displaces the clamping element. On the opposite side the rod penetrating the hub body is provided with a tightening nut screwed thereon.

In a known embodiment of such a fastener it is secured against theft. For this purpose the eccentric bolt arranged within the head of the rod as well as within the clamping element is provided with a hollow socket opening. For actuating the fastener a corresponding hollow socket wrench is inserted into the eccentric bolt and turned into the respective direction so that the hub is either released from the bicycle fork or fastened to it. Since the lever for actuating the hollow socket eccentric bolt is not permanently arranged at the eccentric bolt, a certain security against theft is provided because the release of the respective wheel requires the use of such a hollow socket wrench. A random theft can thus be prevented, but not a planned theft, since the thief must have a corresponding hollow socket wrench, which presents no particular obstacle for a planned theft because such hollow socket wrenches are commercially freely available.

Based on these facts the present invention has the object to provide an improved security device against theft for a quick release hub for bicycles.

SUMMARY OF THE INVENTION

The technical solution to this object is characterized by a security device against theft that locks or releases as desired the opening of the eccentric bolt for insertion of the lever with a respective lock.

A security device against theft embodied according to this technical teaching has the advantage that not only random theft is prevented but also a planned theft. The basic idea of the invention lies in the fact that the quick release mechanism in its fastening position is lockable, i.e., the hollow socket opening of the eccentric bolt is not accessible to the corresponding hollow socket wrench and the quick release hub is thus not releasable. In this manner, the forward as well as the rearward wheel of the bicycle are securable in a technically simple manner.

In a preferred embodiment it is suggested that the lock is arranged at the clamping element. This provides for a technically simple arrangement of the lock in which the clamping element must only be correspondingly retrofitted so that even conventional quick release hubs can be retrofitted in a simple manner.

Preferably, the lock is provided with a lockable or openable through bore aligned with the opening of the eccentric bolt for insertion of the insertable lever. Accordingly, a technically simple design of the lock is realized by releasing or locking the access to the opening of the eccentric bolt.

In a preferred embodiment it is suggested that a sleeve is fixedly connected to the clamping element, coaxially enclosing the clamping element, and supports the lock. This sleeve, which is preferably comprised of metal, preferably has such an inner diameter that it may receive any conventional and commercially available clamping element. The sleeve is provided with the same bores as the clamping element so that the accessibility for the clamping lever is ensured.

In a further embodiment it is suggested that the sleeve is provided with at least one opening in its mantle surface, preferably with two diametrically opposed openings, into which the end of the eccentric bolt extends and thereby fixes the sleeve on the clamping element. Accordingly, in a technically simple manner a fixation of the sleeve on the clamping element that is to be secured is ensured by first sliding the sleeve onto the clamping element, subsequently inserting the eccentric bolt through the corresponding openings and fixing it, for example, with screws or a spring ring within the transverse bores so that a fast connection between the sleeve and the clamping element is achieved by employing the eccentric bolt which is required anyway.

A further embodiment of the sleeve suggests that the mantle surface of the sleeve has essentially a U-shape in which a ring with a perforation is freely rotatably supported, whereby the lock is connected to the ring. This freely rotatable ring which can be comprised of, for example, metal, ensures that the security device cannot be forcibly removed because the free rotatability of the ring does not allow a force engagement with a corresponding tool, for example, a pair of pliers.

In order to support this effect, the ring preferably extends past the U-shape of the sleeve in the radial direction. Preferably, the ring has a T-profile whereby the top of this T-profile covers the two legs of the U-shaped sleeve.

In another embodiment of the invention it is suggested that between the sleeve and the clamping element an adaptor sleeve is provided. This adaptor sleeve serves as a compensation of great differences between the outer diameter of the clamping element and the inner diameter of the sleeve. The adaptor sleeve can be closed at its face and thus prevent the introduction of dirt or water.

In an alternative embodiment the outer mantle surface of the sleeve has essentially a U-shaped profile in which a padlock body as well as a U-shaped bracket that is removable from the padlock body in the unlocked position is correspondingly received. With this embodiment the basic idea of the invention is also realized, i.e., to prevent access to the opening within the eccentric bolt. Only by releasing the padlock access is possible so that the lever can be inserted. The padlock with its body as well as U-shaped bracket is profiled according to the U-shaped outer mantle surface of the sleeve. In order to prevent disturbing noises it is possible to provide a plastic coating between the movable parts.

In order to make a forceful opening of the fastener more difficult in this embodiment, it is suggested in a preferred development to provide the padlock in freely rotatable manner within the U-profile.

In another embodiment of the inventive security device against theft it is suggested to at least partially enclose it by a plastic enclosure. On the one hand, this makes the introduction of dirt more difficult, on the other hand, the engagement of tools is prevented.

Based on a quick release hub in which at the end of an axially slidable rod remote from the fastener a tightening nut is provided, in a further embodiment it is suggested that on the tightening nut a ring is arranged which is coaxially positioned and freely rotatable thereon. Thus, an access to the quick release hub on the opposite side is also prevented so that the tightening nut cannot be forcibly released. Preferably, the ring is also made of metal.

In another embodiment it is suggested that the ring is guided within a circumferential groove of the tightening nut. This ensures a technically simple arrangement of the ring on the tightening nut. The circumferential groove can be provided in the form of a T-profiling in a cross-sectional view whereby on the other side a spacer ring is arranged so that between these parts the circumferential groove is defined.

Finally, it is suggested in another embodiment that the fastener with its security device against theft is provided with a projection with which further parts that are easily stolen can be covered. For example, these parts may be components of the gear shift system.

At last, the inventive security device against theft is not only suitable for quick release hubs, but also, for example, for the fastening mechanism of a height-adjustable seat of the bicycle which is also embodied as a quick release mechanism.

BRIEF DESCRIPTION OF THE DRAWINGS

Two embodiments of an inventive quick release hub are described with the aid of the drawings in the following. It is shown in.

DESCRIPTION OF PREFERRED EMBODIMENTS

Figure 1:
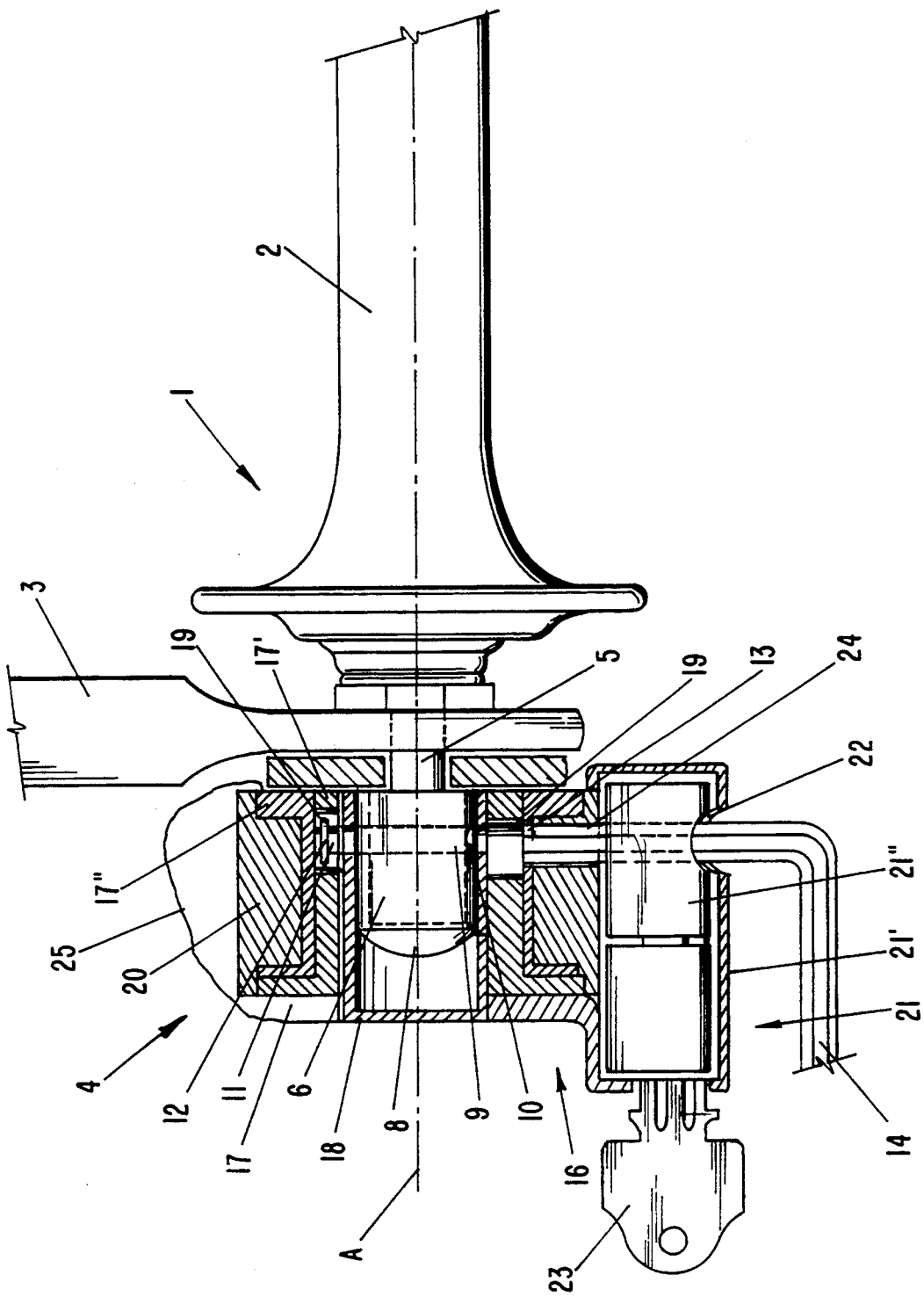
FIG. 1 a schematic representation of a first embodiment of the quick release fastener.

The quick release fastener in FIG. 1 is comprised of a quick release hub 1 with a hub body 2 to which the non-represented spokes of a wheel are connected in a manner known per se. The quick release hub 1 of the wheel is connected between the forks 3 of a bicycle, especially a racing bicycle or a mountain bicycle.

Figure 3:
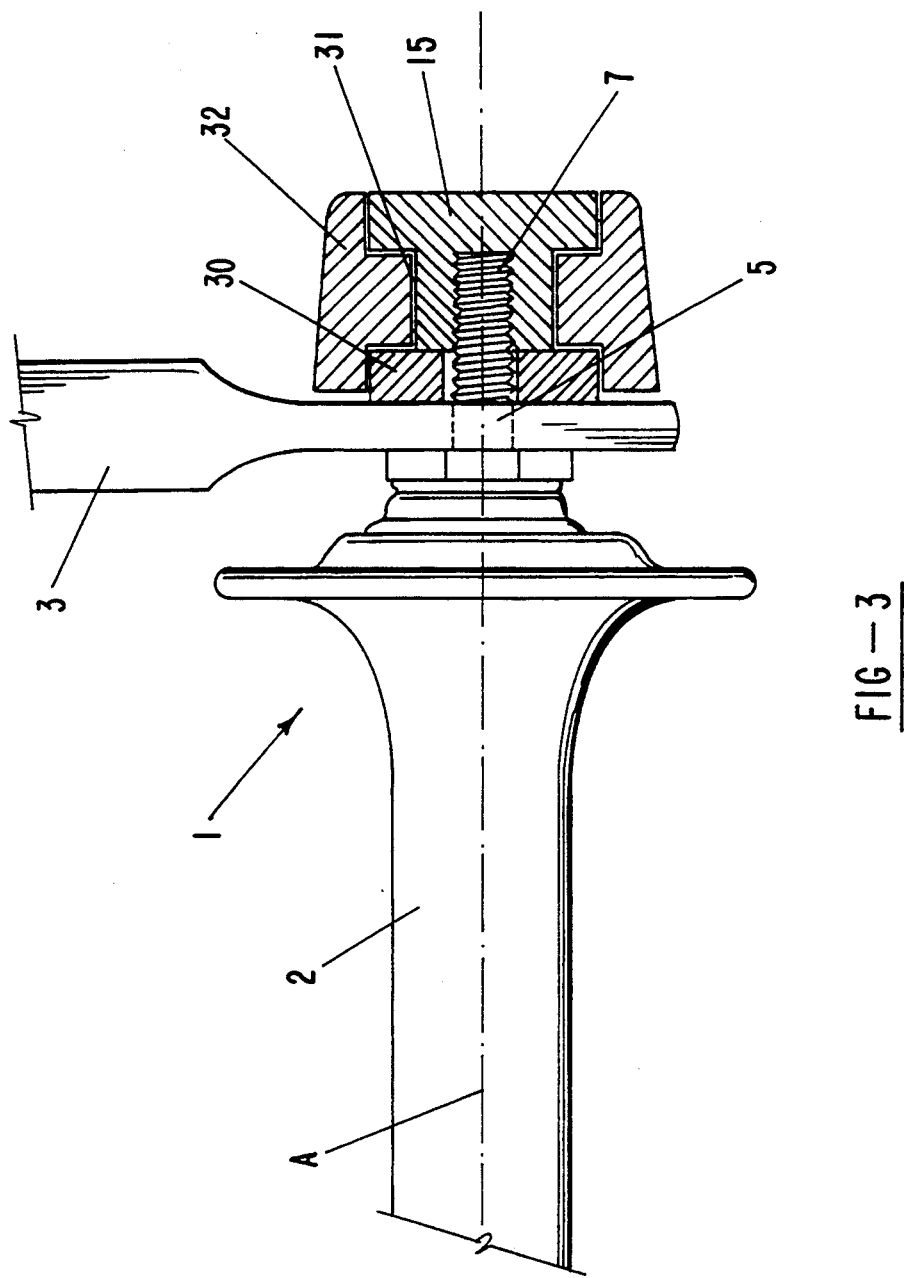
FIG. 3 the opposite end of the quick release fastener of FIGS. 1 and 2.

For this attachment the quick release hub 1 is provided with a fastener 4. The hub body 2 is penetrated by a rod 5 in the axial direction, the rod 5 being axially slidable. The rod 5 on one end is provided with a bolt-like head 6, while the other end (FIG. 3) has an axial thread 7. Between the head 6 of the rod 5 and the hub body 2 a non-represented pressure spring is arranged which biases the rod 5 into the position to the left in the drawing. A cap-shaped and bolt-like clamping element 8 is positioned on the head 6 of the rod 5. The head 6 is provided with a transverse bore 9 that is transverse to the axis A of the hub. Correspondingly, the sleeve-type clamping element 8 is provided with bores 10 in the mantle surface that are aligned with the transverse bore 9 of the head 6. The transverse bore 9 of the head 6 as well as the two bores 10 of the clamping element 8 are penetrated by an eccentric bolt 11 and are secured at one end by a spring ring 12. Instead of the spring ring 12 it is also possible to use a screw. The other end of the eccentric bolt 11 is provided with an opening 13 in the form of a hexagonal hollow socket aligned with the axis of the bolt. In this opening 13 a lever 14 in the form of a hollow socket wrench is insertable. By turning this lever 14 the eccentric bolt 11 is rotated within the head 6 of the rod 5 whereby due to the eccentricity the clamping element 8 is axially displaced and a clamping of the quick release hub 1 on the fork 3 is achieved.

On the opposite end of the rod 5 a tightening nut 15 is threaded onto the axial thread 7. Accordingly, with the displacement of the rod 5 a clamping of the quick release hub 1 onto the fork 3 is also achieved.

The aforedescribed quick release hub 1 with the fastener 4 in this form is known from the prior art. In addition, the inventive design provides a security device against theft 16 which will be described in the following:

First, for the security device against theft 16 a sleeve 17 is slid over the cap-shaped clamping element 8. Between the clamping element 8 and this sleeve 17 an adaptor sleeve 18 is interposed which is outwardly closed and thus prevents the introduction of dirt or water. Aligned with the transverse bore 9 of the head 6 as well as with the bore 10 of the clamping element 8 the sleeve 17 as well as the adaptor sleeve 18 are provided with diametrically opposed openings 19 into which the two ends of the eccentric bolt 11 extend so that fixation of the sleeve 17 as well as of the adaptor sleeve 18 on the clamping element 8 is ensured.

The sleeve 17 has a U-shaped longitudinal profile. For this purpose, the sleeve 17 is comprised of a sleeve body 17' with an L-shaped longitudinal profile onto which an end ring 17" is pressed. A ring 20 made of metal is freely rotatably arranged within the thus defined circumferential groove whereby this ring 20 radially extends past the sleeve 17. For this purpose, the ring 20 has a T-shaped longitudinal profile whereby the top of the T-shaped profile covers the two legs of the sleeve 17. A lock 21 is connected to the ring 20. This lock 21 has a lock housing 21' in which a massive steel cylinder is rotatable. Furthermore, the lock housing 21' as well as the steel cylinder 21" of the lock 21 are provided with a through opening 22 which is lockable by a key 23 by displacing the steel cylinder 21". The ring 20 has a perforation 24 aligned with this through opening 22 within the lock housing 21' and the steel cylinder 21" of the lock 21.

Finally, the fastener 4 is provided with a plastic enclosure 25.

The aforedescribed security device against theft 16 of the embodiment according to FIG. 1 functions as follows:

In the locked position the through opening 22 of the lock 21 is locked so that the opening 13 of the eccentric bolt 11 is inaccessible to the lever 14. When it is desired to remove the wheel from the fork 3 of the bicycle, the lock 21 is opened with the key 23 and the through opening 22 is opened. The ring 20 is then turned such that its perforation 24 is aligned with the opening 13 of the eccentric bolt 11 so that the lever 14 in the form of a hollow socket wrench can be inserted and the fastener 4 can be released.

The locking procedure is carried in the reverse order.

Figure 2:
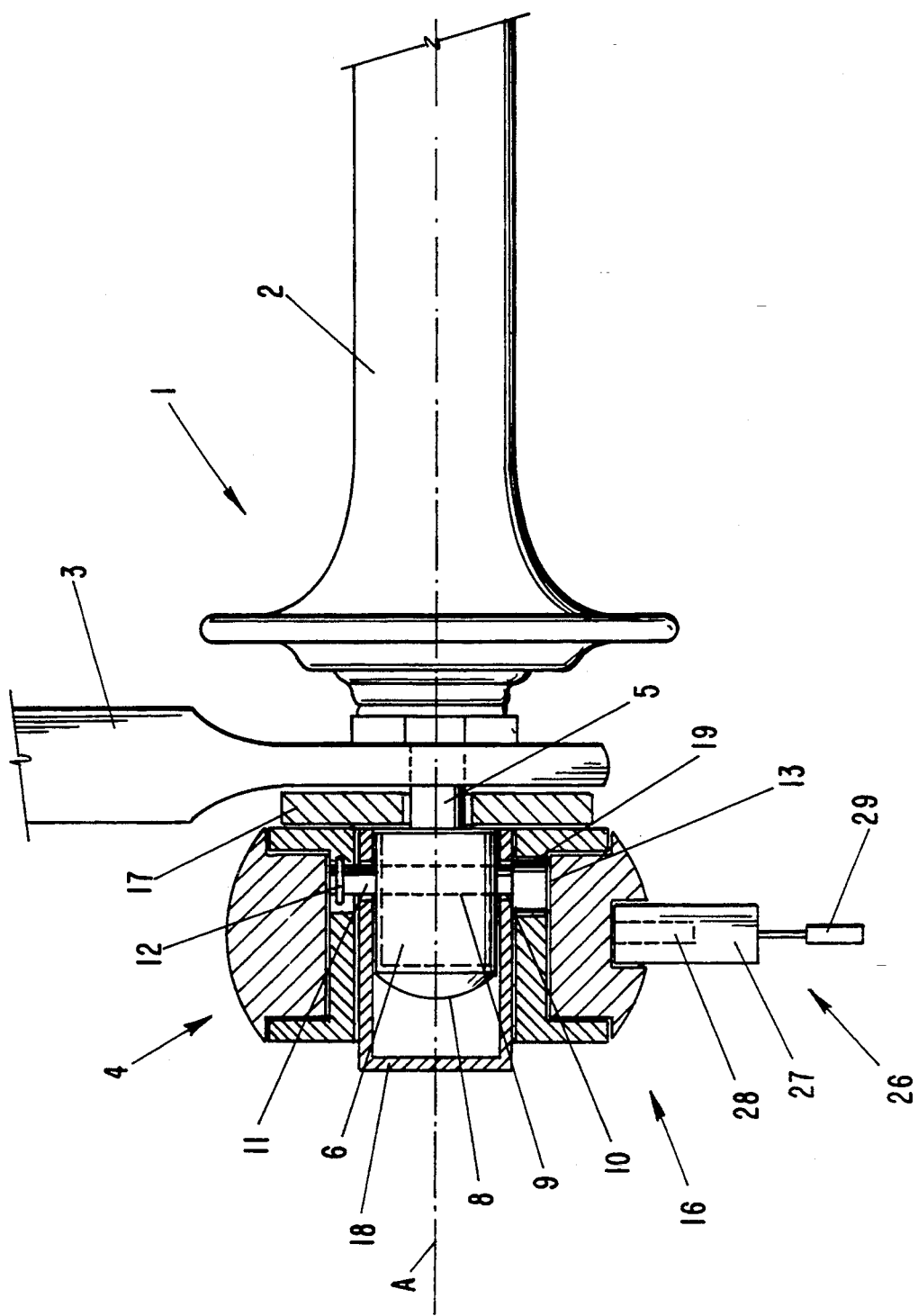
FIG. 2 a second embodiment of the quick release fastener in a representation corresponding to FIG. 1.

In the embodiment of FIG. 2 a sleeve 17 is also provided with a U-shaped longitudinal profile. The securing device against theft is in the form of a padlock 26. This is comprised of a body 27 as well as a U-shaped bracket 28. The body 27 as well as the bracket 28 of the padlock 26 are embodied to fit in the circumferential groove of the sleeve 17. Accordingly, when the padlock 26 is positioned in the groove, the opening 13 of the eccentric bolt 11 is covered and inaccessible to the lever 14. For releasing the fastener 4 the padlock 26 is first unlocked with a key 29 so that the U-shaped bracket 28 is removable from the body 27 and turnable so that the padlock 26 can be removed from the sleeve 17. Thus, the opening 13 of the eccentric bolt 11 is accessible so that the bolt 11 can be actuated with the lever 14.

Both embodiments of the fastener 4 have in common that on the opposite side of the quick release hub 1 (FIG. 3) a securing means is provided with which a forcible removal of the tightening nut 15 is prevented. For this purpose, a spacer ring 30 is arranged between the fork 3 and the tightening nut 15 which together with a tightening nut 15 defines a circumferential groove 31. A freely rotatable ring 32 is arranged within the circumferential groove 31 so that when a pair of pliers is applied to the tightening nut 15 no rotational force can be exerted on the tightening nut 15.

In a non-represented embodiment the security device against theft 16 may be provided with a projection in order to cover the fastening means of the gear shifting mechanism and thereby secure it against theft.

It is furthermore possible to employ the inventive security device against theft in principle for the fastening mechanism of a height-adjustable seat in order to realize a theft protection for the seat.

The present invention is, of course, in no way restricted to the specific disclosure of the specification and drawings, but also encompasses any modifications within the scope of the appended claims.

What I claim is:

1. A bicycle quick release mechanism for fastening a removable part to a frame of a bicycle, comprising:
   a clamping element;
   an eccentric bolt with an opening rotatably supported within said clamping element;
   a lever engaging said opening of said eccentric bolt, said lever, upon turning said eccentric bolt within said clamping element, fastening and releasing the removable part from the frame;
   a security device against theft comprising a look for unlocking and locking said opening of said eccentric bolt;
   further comprising a sleeve fixedly connected to and coaxially enclosing said clamping element, said sleeve supporting said lock;
   wherein said sleeve has a mantle surface with at least one opening into which opening one end of said eccentric bolt extends thereby fixing said sleeve to said clamping element; and
   wherein said sleeve is essentially U-shaped and forms a circumferential grove, and further comprising a ring positioned within said circumferential groove and freely rotatable therein, said ring having a perforation, with said lock attached to said ring.

2. A bicycle quick release mechanism according to claim 1, wherein said lock is positioned near said clamping element.

3. A bicycle quick release mechanism according to claim 1, wherein said lock has a lockable through bore, aligned with said opening of said eccentric bolt, for inserting said lever.

4. A bicycle quick release mechanism according to claim 1, wherein said mantle surface has two of said openings diametrically opposed to one another, with said one end of said eccentric bolt extending into the first of said two openings and the other end of said eccentric bolt extending into the second of said two openings.

5. A bicycle quick release mechanism according to claim 1, wherein said ring radially extends past said sleeve.

6. A bicycle quick release mechanism according to claim 1, further comprising an adaptor sleeve inserted between said clamping element and said sleeve.

7. A bicycle quick release mechanism according to claim 1, further comprising a plastic enclosure for enclosing at least partially said security device against theft.

8. A bicycle quick release mechanism according to claim 1, further comprising an axially slidable rod connected with one end to said clamping element and a tightening nut threaded onto the other end of said rod, and further comprising a ring connected to said tightening nut so as to be freely rotatable on the periphery of said tightening nut.

9. A bicycle quick release mechanism according to claim 8, wherein said tightening nut has a circumferential groove for guiding therein said ring.

* * * * *